Figure 1:
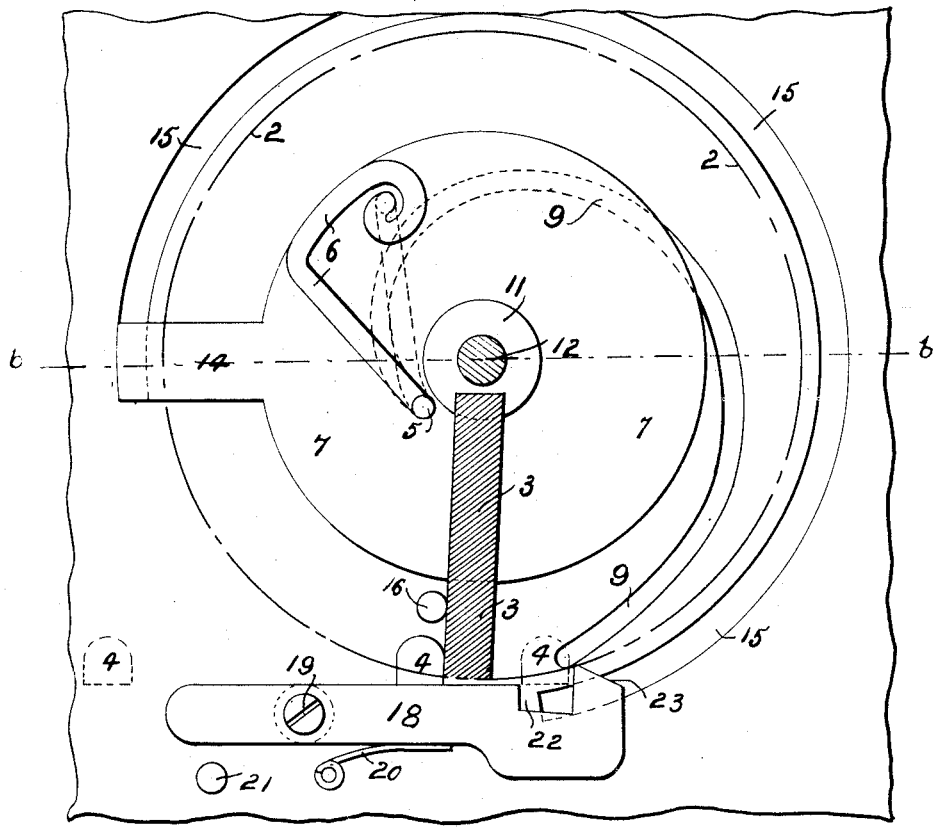

W. HUNT & W. TAYLOR.
MEANS FOR REGULATING THE SPEED OF PHOTOGRAPHIC SHUTTERS.
APPLICATION FILED NOV. 28, 1910.

1,009,521.

Patented Nov. 21, 1911.

4 SHEETS—SHEET 1.

WITNESSES

INVENTORS
Wilfred Hunt and
William Taylor
by Howson and Howson
Hubert Howson attys.

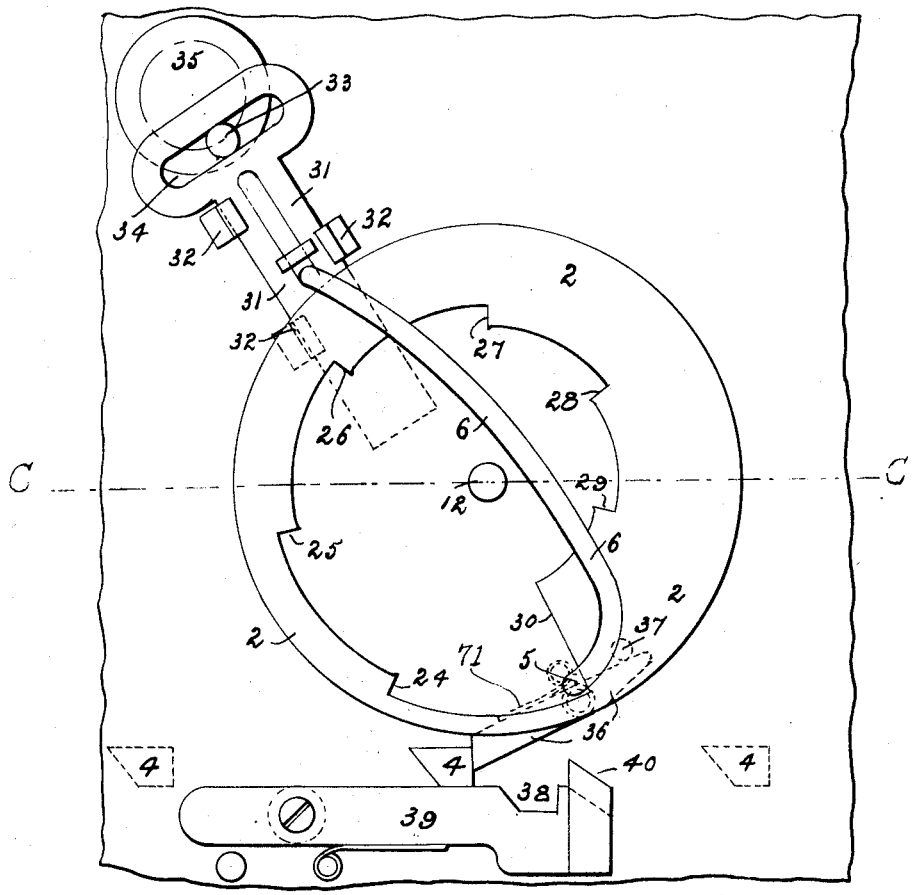

W. HUNT & W. TAYLOR.
MEANS FOR REGULATING THE SPEED OF PHOTOGRAPHIC SHUTTERS.
APPLICATION FILED NOV. 28, 1910.

1,009,521.

Patented Nov. 21, 1911.

4 SHEETS—SHEET 3.

WITNESSES
L. H. Grote
W. E. Keir

INVENTORS
Wilfred Hunt and
William Taylor
by Howson and Howson
Hubert Howson attys.

W. HUNT & W. TAYLOR.
MEANS FOR REGULATING THE SPEED OF PHOTOGRAPHIC SHUTTERS.
APPLICATION FILED NOV. 28, 1910.
1,009,521.
Patented Nov. 21, 1911.
4 SHEETS—SHEET 4.
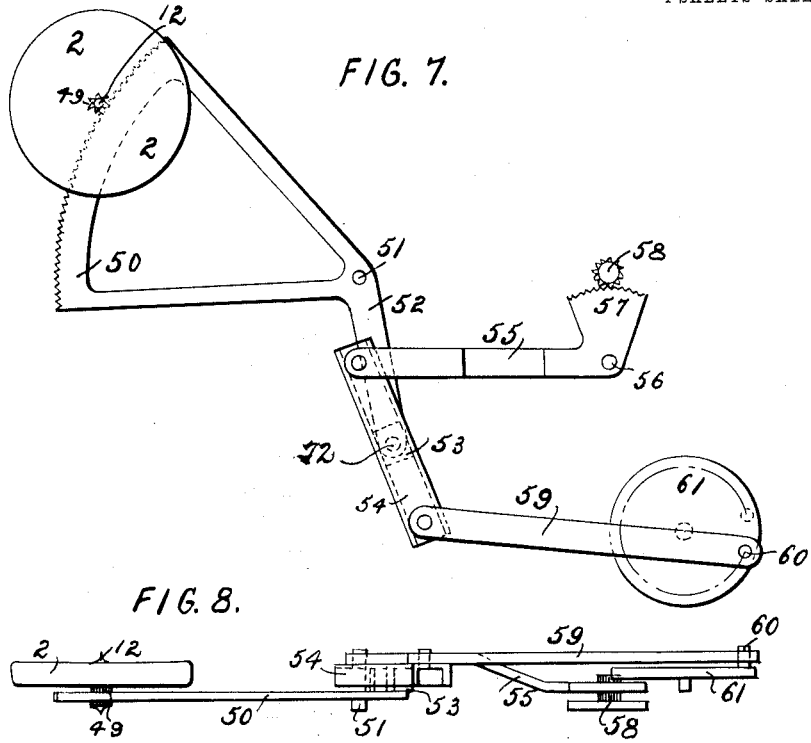
FIG. 7.
FIG. 8.
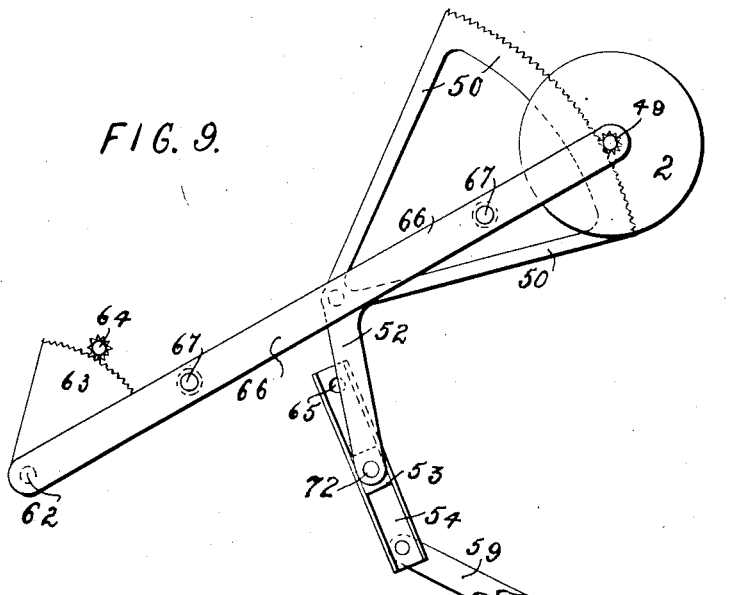
FIG. 9.
WITNESSES
INVENTORS:
Wilfred Hunt and
William Taylor
by Howson and Howson
Hubert Howson Attys.

UNITED STATES PATENT OFFICE.

WILFRED HUNT, OF GLASGOW, SCOTLAND, AND WILLIAM TAYLOR, OF LEICESTER, ENGLAND.

MEANS FOR REGULATING THE SPEED OF PHOTOGRAPHIC SHUTTERS.

1,009,521.   Specification of Letters Patent.   Patented Nov. 21, 1911.

Application filed November 28, 1910. Serial No. 594,554.

*To all whom it may concern:*

Be it known that we, WILFRED HUNT and WILLIAM TAYLOR, subjects of the King of Great Britain and Ireland, and residents, respectively, of Glasgow, Scotland, and Leicester, England, have invented certain new and useful Means for Regulating the Speed of Photographic Shutters, and of which the following is the specification.

The invention has for its object to provide means for regulating the speed of photographic shutters, such that, while a wide range of exposures may be provided, the regulation is not subject to variation by those various factors which disturb the regularity of controling devices hitherto employed.

Essentially the invention consists in applying to a moving part of the shutter and to control its period a rotatory mass rotated first in one direction and then in the other after the manner of a clock balance wheel. Means are provided for rotating this mass with reversal a series of amounts different for the different exposures it is desired the shutter should give—from zero (no) movement for the maximum speed of the shutter to a maximum for the minimum speed thereof.

Where the shutter is of that now well-known type opening rapidly and closing rapidly and in which the parts are held for the duration of exposure in the open position by a detent or the like released to close the shutter at the termination of the exposure, the balance wheel may be operated by the impact of a tappet operated with or by the opening shutter and engaging a coacting tappet on the wheel. A spring buffer is placed to receive the wheel upon its performing a prescribed travel and reacts to return it, means being provided and operated by it on its return to release the detent retaining the shutter open whereupon the latter closes. Variability of the amount of movement of the wheel and so of the period is attained by varying the position of the buffer. Such a form of device is obviously applicable to any form of shutter held or adapted to be held by a detent in open position during the period of an automatic exposure.

Where the shutter is of that type in which there is no determinate holding open of the parts at mid exposure—that is, in which exposure takes place during a more or less constant movement of the parts—there is applied a modification of the device (also applicable to the first type of shutter) in which the balance wheel is rotated with reversal by suitable gearing such as a toothed quadrant engaging a pinion on the balance wheel spindle. The toothed quadrant is reciprocated by link or like motion from a moving part of the shutter, and through the resistance of the balance wheel controls directly the speed of movement of that part and so the duration of the exposure given by the shutter. The amount of reciprocation given the quadrant is varied by means of any convenient form of link or variable-stroke device interposed between it and the part from which it receives its motion.

Figure 2:
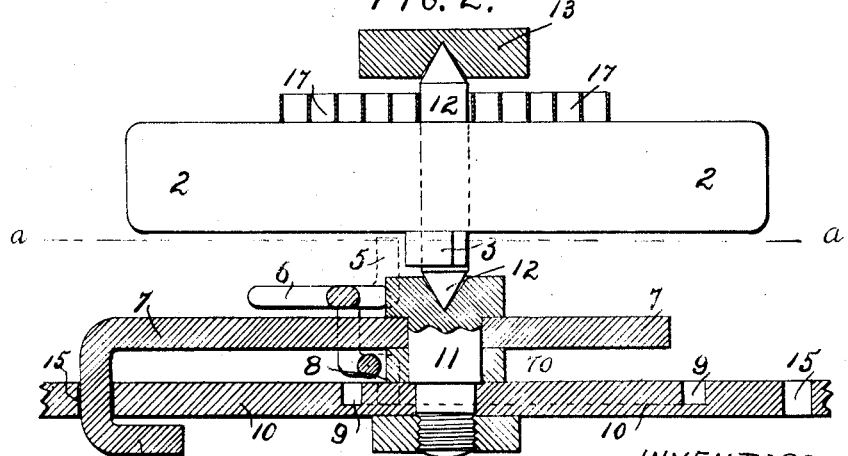
Figure 5:
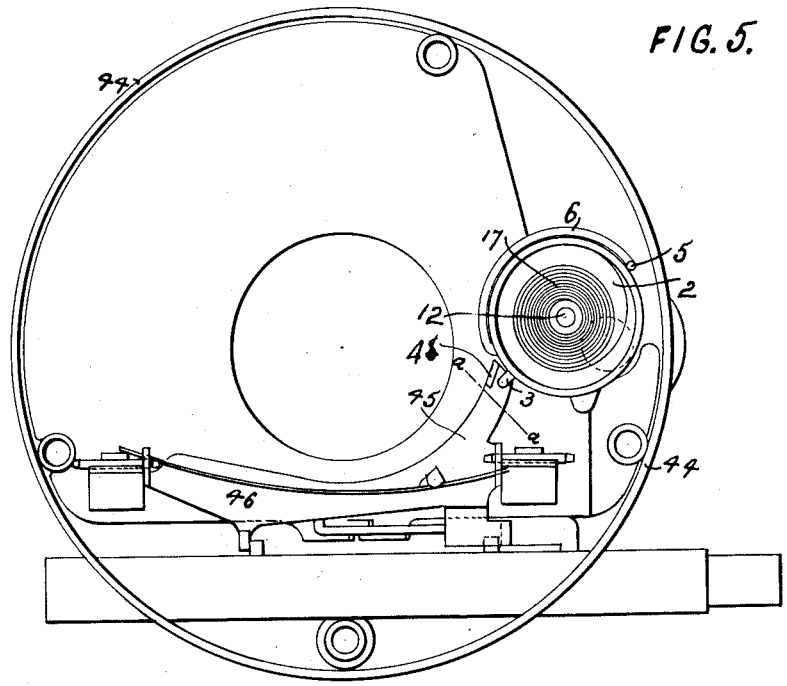
Figure 6:
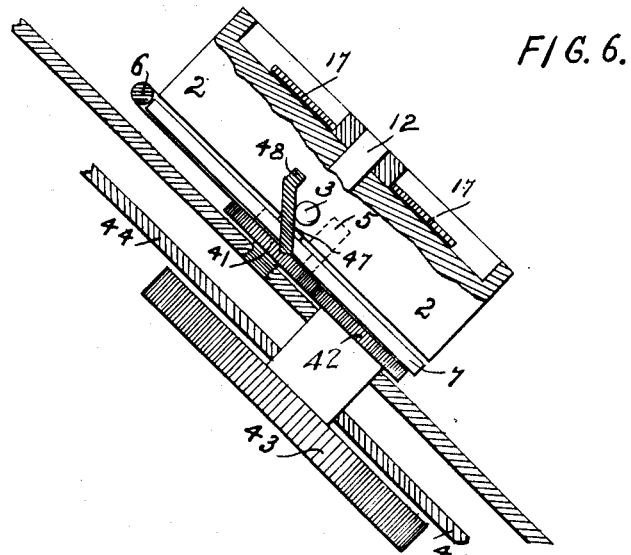

In order that the invention and the manner of performing the same may be properly understood there are hereunto appended four sheets of explanatory drawings showing in Figs. 1 and 2, Sheet 1, in broken sectional plan on the line *a—a*, Fig. 2, and in broken sectional elevation on the line *b—b*, Fig. 1, respectively an example of a device in which the balance wheel is impact-operated, in Figs. 3 and 4, Sheet 2, in plan and in broken sectional elevation on the line *c—c*, Fig. 3, respectively a second example in which the balance-wheel is impact-operated, in Figs. 5 and 6, Sheet 3, in like views (the latter on line *a—a*, Fig. 5) an example of the application of an impact-operated balance wheel to the control of a shutter described in the specification of Taylor's United States patent application of 25th April, 1904, in Figs. 7 and 8, Sheet 4, in like views an example in which the balance wheel is directly connected by gearing to and operated by the shutter, and in Fig. 9 in plan a variation upon this form.

It is here to be pointed out that with the exception of that shown as applied to the shutter which is the subject-matter of the patent hereinbefore referred to the examples are of necessity diagrammatic—the device is obviously applicable in one or other of its forms to any shutter operating near the lens and in the multiplicity of known shutters it is not possible to show here the exact means or manner of application in any particular case, but this is a matter of selection and minor design within the scope of those skilled.

The drawings are to a large scale.

In the diagrammatic and illustrative example shown in Figs. 1 and 2 of the first modification hereinbefore referred to, the impact-operated balance wheel 2 (indicated by chain lines in Fig. 1 which is a sectional plan beneath its level) has upon its under side a radial tappet 3. This tappet 3 is engaged by an upstanding pin 4 assumed for the purpose of illustration to be moved from the left hand dotted position during opening of the shutter to the right hand dotted position, remaining there while the shutter is open and finally during closing of the shutter returning to the left hand position. The tappet 3 is also adapted to engage the upstanding end 5 of a buffer spring 6 of hair-pin shape bent to give resiliency in its upper part, threaded through a plate 7 so that it may oscillate therein and having its under end 8 bent down at right angles coincident with the end 5 and engaging a volute groove 9 in a base plate 10 on which is a stud 11 in which the spindle 12 of the balance wheel 2 is pivoted, while its upper end is supported by a bridge 13. The plate 7 is engaged between the head of the stud 11 and the base plate 10, a washer 70 being interposed. Thus the plate 7 is rotatable about the axis of the balance wheel and a handle 14 bent down and passing out through a slot 15 is provided for its rotation. A stop 16 in the base plate 10 is provided engaging the tappet 3, while a light watch hair-spring 17 fixed between the balance wheel and the bridge tends always to keep the tappet against this stop. A detent lever 18 pivoted on a stud 19, controlled by a spring 20 co-acting with a stop 21, having in it a jaw 22 to engage the pin 4 and an inclined surface 23 engaged by the returning tappet 3, is shown as illustrative of the action.

In operation, upon release of the shutter for exposure the pin 4 commences to travel to the right and bearing upon the detent lever 18 presses it out of its way. The pin 4 moving with speed encounters the tappet 3 and by impact drives the balance wheel 2 around against the light resistance of the spring 17 (the balance wheel being suitably proportioned to the force exerted upon it by the pin 4). The balance wheel 2 then proceeds until its tappet 3 encounters the upstanding end 5 of the buffer spring 6, and in the meantime the pin 4 enters and is held in the jaw 22 of the detent lever 18. Upon its tappet 3 encountering the buffer spring end 5 the wheel is brought to rest and then accelerated in the opposite and return direction by that spring. Upon the return of the balance wheel, its tappet 3 engages the surface 23 of the lever 18 and passing over that surface frees the pin 4 from the jaw 22, the pin 4 returns to the left and the shutter closes. The time the pin 4 remains held by the jaw 22, and consequently the time for which the shutter remains open, depends upon the distance traveled by the balance wheel and by the resistance period of the buffer spring 6 (modified in a negligible degree by the spring 17). The distance the wheel runs depends upon the position of the buffer spring 6. Its position is angularly adjustable by rotation of the plate 7 by the handle 14. The resistance period of the buffer spring 6 depends upon the radial position of its end 5. In the position shown in Fig. 1 the travel of the wheel is the greatest, the radial distance of the end 5 the least; so that not only does the wheel take the greatest time to encounter the buffer spring but that spring also takes the greatest time to reverse the wheel's motion. As the handle 14 is moved around clockwise, not only is the angular travel of the wheel reduced, but the buffer spring end 5 being moved radially out by the engagement of its coincident end 8 with the volute groove 9, its resistance relatively to the wheel is increased and the total period of the wheel reduced. Thus a wide range of periods is obtainable between the positions of the spring 6 for least angular movement of the wheel and for greatest. As hereinafter shown in one example, the radial movement of the buffer spring 6 may be dispensed with as sufficient variation of speed is obtainable by variation of angular position alone.

In the illustrative example shown in Figs. 3 and 4 the balance wheel 2, preferably controlled by a light hair spring (omitted for the sake of clearness), is recessed upon its upper surface in the form of a volute internal ratchet having a series of teeth 24, 25, 26, 27, 28, 29, and a stop 30. The buffer spring 6 arranged substantially radially has a down-turned end 5 adapted to engage these teeth and is anchored upon a slide 31 which may be moved radially in guides 32 by an eccentric pin 33 engaging a slot 34 in it and carried on a disk 35 adjustable by hand. The same effect is thus obtained as in the foregoing example—the annular movement of the balance wheel and the radial position of the buffer spring are jointly adjusted by setting the disk 35. In this example it is assumed that the pin 4 or other part moving with or moved by the shutter in opening and closing instead of reciprocating moves in a straight line with a stoppage in the middle of its travel and while the shutter is open. The two devices illustrative of this are of course interchangeable, and moreover they form no direct part of the invention, nor are they limitative.

They are only intended to show broadly the carrying out of the invention, the exact manner of performing the same as regards construction, proportion, and arrangement of parts depend obviously upon the particular form of shutter, and there are more forms to which the device can be applied by those skilled and without invention than it would be possible even to catalogue here. The pin 4 in this example passes from left to right, as indicated by dotting, and in so passing engages a pawl 36 pivoted on the balance wheel 2 controlled by a spring 71 and acting against a stop 37—this pawl being movable only so that the pin 4 may lift it in returning from right to left when the shutter is being set. The stop 30 acts against the end of the spring 6 to hold the wheel in the position shown. Upon the pin 4 engaging with impact the pawl 36, the balance wheel is thrown around as before while the pin enters and is held in a jaw 38 in a detent lever 39 similar to the detent lever 18, the shutter being now open. On its return the pawl 36 encounters a slope 40 fixed on the end of the lever 39 and above the level of the pin 4 and moving that lever releases the pin 4 which moves to the right hand position, the shutter meanwhile closing.

In Figs. 5 and 6 the device as applied to a shutter of the type described in the specification of the prior patent hereinbefore referred to only differs in structural detail from that first herein described in that the buffer spring 6 is moved angularly only and not conjointly radially. This spring is anchored around the edge of a plate 7 rotatable about the balance wheel pivot 12 and bearing a pinion 41 with which there gears a pinion 42 operated by a handwheel 43 outside the case 44 of the shutter and by which the angular position of the spring may be adjusted. The tappet 3 is in the form of a simple radial pin, engages the upturned end 5 of the buffer spring 6 and is engaged by the impact device. The impact device consists simply of a tail-piece 45 on what is termed the "controlling gate" 46 of this shutter. As will be seen in Fig. 6, which is a sectional elevation to an enlarged scale on the line a—a of Fig. 5, the end of this tail piece 45 is formed with an inclined surface 47 and a part 48 acting as a stop. Opening of the shutter raises the tail piece, its incline 47 flies up against the pin 3 and operates the wheel 2. Upon the wheel returning the pin 3 engages the incline 47 forces the gate down and releases the shutter to close.

Figs. 7 and 8 illustrate in diagram an example of the second modification. These illustrations and also Fig. 9 being arranged for the sake of clearness are obviously not applicable directly to commercial shutters, but their modification to suit these is only a matter of rearrangement of their parts. In this example the spindle 12 of the balance wheel 2 has on it a pinion 49 which gears with a quadrant 50 on a fixed pivot 51. On the quadrant 50 is an arm 52 bearing, on a pin 72, a block 53 engaging a link 54 of channel-section. One end of the link 54 is attached to a lever 55 on a fixed center 56 and capable of rotation thereon through an arc of teeth 57 and a pinion 58. The other end of the link 54 is reciprocated in any suitable way from the shutter, for instance it may be connected by a link 59 to a pin 60 on a part 61 of the shutter which is assumed to rotate once during exposure. The amount of motion transferred from the link 54 to the quadrant 50 and so to the balance wheel 2 depends of course upon the position of that link relatively to the block 53. Thus, the control offered by the balance wheel may be varied from zero—when the link 54 is in such a position that no motion is transmitted to the wheel—to maximum—when it is in position for the transmission of maximum motion. The alteration in position is effected by moving the lever 55 by means of the pinion 58.

In the example shown in Fig. 9 the balance wheel 2 with its pinion 49 and the quadrant 50 with its block-bearing arm 52 are carried in a frame formed of straps 66 held by distance thimbles 67 and pivoted on a fixed pivot 62 about which the whole is turnable by an arc of teeth 63 formed on one of the straps 66 and engaged by a pinion 64. The channel link 54 is on a fixed pivot 65 at one end, and at the other end is connected to the shutter so as to be reciprocated thereby by the link 59. Movement of the frame 66 obviously varies the movement transmitted from the link 59 as the block 53 is moved to or from the pivot 65.

The essence of the invention is the provision of a balance wheel rotated with reversal, interconnecting means between it and the shutter for the control of the latter, and means for varying the amount of rotation of the wheel. The essence generically of the first form is that the balance wheel is free, rotates under the impact of a moving shutter part, and returns to release a detent holding the shutter open. The generic essence of the second form is that the balance wheel is operated by interconnected gearing and directly controls the whole movement of the shutter. It is apparent that the balance wheel in the first form need not receive direct impact—it may receive impact through gearing of the kind applied in the second form.

Since the period of exposure is determined by the inertia of a mass and the power of springs—factors practically speaking invariable—it follows that the control offered by the device is much more consistently accurate than is possible with other devices such as brakes or pneumatic dashpots hitherto applied.

What we claim is:—

1. A controlling device for photographic shutters comprising a balance wheel operatively connected to the shutter to control its exposing period, means for rotating the balance wheel with reversal during the exposing period of the shutter and means for varying the amount of rotation of the balance wheel.

2. A controlling device for photographic shutters comprising a balance wheel, an impact device on the shutter encountering the balance wheel to rotate it, a buffer device encountered by the balance wheel to return it and adjustable in position circumferentially to the balance wheel, and a detent holding the shutter and operated by the returning balance wheel.

3. A controlling device for photographic shutters comprising a balance wheel, an impact device on the shutter encountering the balance wheel to rotate it, a buffer device encountered by the balance wheel to return it and adjustable in position circumferentially and radially to the balance wheel, and a detent holding the shutter and operated by the returning balance wheel.

4. A controlling device for photographic shutters comprising a balance wheel, an impact device on the shutter encountering the balance wheel to rotate it, a buffer device encountered by the balance wheel to return it and adjustable in position circumferentially to the balance wheel, a detent holding the shutter and operated by the returning balance wheel, and a spring tending to return the balance wheel to normal position.

5. A controlling device for photographic shutters, comprising a balance wheel operatively connected to the shutter to control its exposing period and means engaged by the shutter to rotate said balance wheel upon the opening of the shutter, substantially as described.

6. A controlling device for photographic shutters, comprising a balance wheel and means engaged by the shutter to rotate said balance wheel upon the opening of the shutter, in combination with a detent for holding the shutter open and means in connection with said balance wheel for freeing said detent after a predetermined open period for the shutter.

7. A controlling device for photographic shutters, comprising a balance wheel and means engaged by the shutter to rotate said balance wheel upon the opening of the shutter, in combination with a detent for holding the shutter open and means in connection with said balance wheel for freeing said detent after a predetermined open period for the shutter, together with means for varying the rotation of said balance wheel to vary the time within which said detent is freed thereby.

8. A controlling device for photographic shutters, comprising a spring-actuated controlling member, means operatively engaged by the shutter for moving said member against the action of its spring and an operative connection between said member and the shutter for controlling the exposure period of the latter.

9. A controlling device for photographic shutters, comprising a spring-actuated controlling member, means operatively engaged by the shutter for moving said member against the action of its spring and an operative connection between said member and the shutter for controlling the exposure period of the latter, together with means for varying the intensity of the action of the spring for said controlling member.

In testimony whereof we have signed our names to this specification, in the presence of two subscribing witnesses.

WILFRED HUNT.
WILLIAM TAYLOR.

Witnesses as to the signature of Wilfred Hunt:
 DAVID FERGUSON,
 BARBARA MILLAR.

Witnesses as to the signature of William Taylor:
 ARTHUR PIERCE,
 H. P. HAGON.